W. J. BENNETT.
FLY-TRAP.
No. 171,085.  Patented Dec. 14, 1875.
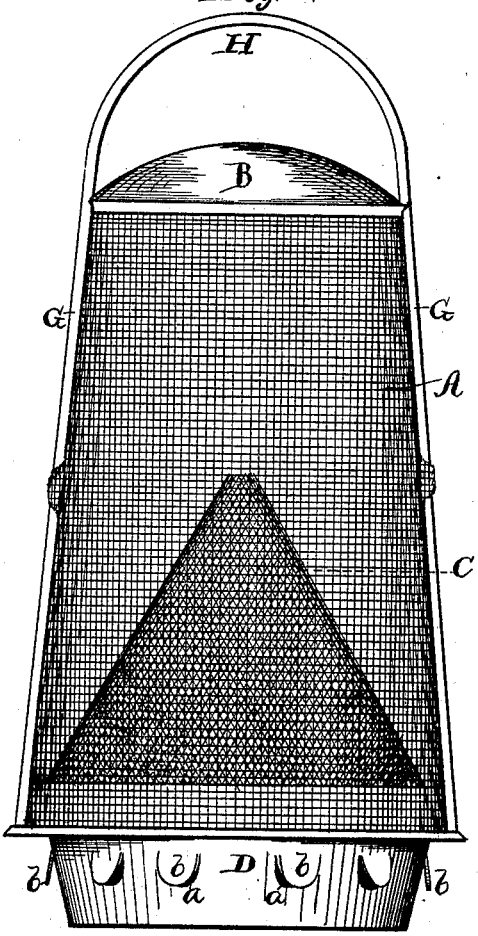
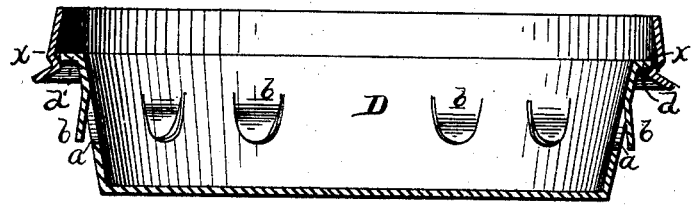
WITNESSES:
Jas. F. Duhamel.
Thomas Byrne.
INVENTOR
W. J. Bennett,
PER H. S. Abbot,
ATTORNEY

UNITED STATES PATENT OFFICE.

WILLIAM J. BENNETT, OF BEAVER DAM, WISCONSIN.

IMPROVEMENT IN FLY-TRAPS.

Specification forming part of Letters Patent No. 171,085, dated December 14, 1875; application filed July 22, 1875.

*To all whom it may concern:*

Be it known that I, WILLIAM J. BENNETT, of Beaver Dam, county of Dodge and State of Wisconsin, have invented certain new and useful Improvements in Fly-Trap, of which the following is a specification:

My invention relates to that class of fly-traps which consist of a wire-cloth cage, with an interior removable wire-cloth cone; and it consists in the construction of the bottom of the cage, and the construction of the cage with a combined strengthening-wire and bail, all as hereinafter more fully set forth.

In order to enable others skilled in the art to which my invention appertains to make and use the same, I will now proceed to describe its construction and operation, referring to the annexed drawing, which forms a part of this specification, and in which—

Figure 1 is a side elevation of a fly-trap embodying my invention. Fig. 2 is a section of the lower part of same.

A represents the wire-cloth cage, with removable top B and the interior removable wire-cloth cone C. D represents the bottom of the trap, made of sheet metal, in the form of a pan, of any suitable depth. In the sides of this pan are punched or stamped a series of semicircular holes, $a$, the metal within the semicircles being bent outwardly to form lips $b$, as shown particularly in Fig. 2. These slots and lips admit of a free passage into the trap, and, the lips covering said passages, it is darkened, and prevents the escape of the flies.

The bottom D is made with flaring sides, so that when the lips are bent outward they will stand vertical. In the lower end of the cage is formed a groove, $x$; and the top of the rim of the bottom D is turned off with a flange, $d$, to fit in said groove by springing into the same, thereby fastening the cage and bottom together. The cage A is provided with an exterior guard, G, formed of one piece of wire, bent in the middle to form a bail, H, at the top, and extending down on opposite sides and through the cage, as shown, stiffening the cage and preventing its collapse.

Having thus fully described my invention, what I claim as new, and desire to secure by Letters Patent, is—

1. In a fly-trap, the bottom D, formed with the passages $a$ and the outwardly-bent covering-lips $b$, substantially as and for the purposes herein set forth.

2. The combination of the cage A and the stiffening-wire G, formed in a single piece, attached to said cage by passing through the wire-gauze at two opposite points, and bent over to form the top bail H, substantially as herein set forth.

In testimony that I claim the foregoing as my invention, I hereunto affix my signature this 16th day of July, 1875.

WM. J. BENNETT.

Witnesses:
J. H. BENNETT,
J. C. EDWARDS.